United States Patent [19]

Natansohn et al.

[11] 4,279,870
[45] Jul. 21, 1981

[54] LIQUID-LIQUID EXTRACTION PROCESS FOR THE RECOVERY OF TUNGSTEN FROM LOW LEVEL SOURCES

[75] Inventors: Samuel Natansohn, Sharon; Sophia R. Su, Wellesley, both of Mass.

[73] Assignee: GTE Laboratories Incorporated, Waltham, Mass.

[21] Appl. No.: 186,950

[22] Filed: Sep. 15, 1980

Related U.S. Application Data

[63] Continuation-in-part of Ser. No. 59,803, Jul. 23, 1979, abandoned, which is a continuation-in-part of Ser. No. 18,488, Mar. 8, 1979, abandoned.

[51] Int. Cl.³ .............................................. C01G 41/00
[52] U.S. Cl. ............................. 423/54; 423/DIG. 14; 75/101 BE
[58] Field of Search .............. 423/54, DIG. 14, 658.5; 75/101 BE

[56] References Cited

U.S. PATENT DOCUMENTS

| | | |
|---|---|---|
| 2,968,527 | 1/1961 | Baker . |
| 3,047,361 | 7/1962 | Hubbard et al. . |
| 3,052,516 | 9/1962 | Drobnick et al. . |
| 3,158,438 | 11/1964 | Kurtak . |
| 3,666,446 | 5/1972 | Cook et al. ........................... 423/54 |
| 3,804,941 | 4/1974 | Coid et al. ............................ 423/54 |
| 3,806,580 | 4/1974 | Bradford et al. ..................... 423/54 |
| 3,826,808 | 7/1974 | Nichols et al. ....................... 423/54 |
| 4,058,585 | 11/1977 | Markay et al. ....................... 423/54 |
| 4,180,628 | 12/1979 | Marchant et al. .................... 423/54 |

FOREIGN PATENT DOCUMENTS

199134 3/1970 U.S.S.R. .................................. 423/54

OTHER PUBLICATIONS

Altringer et al., "Bureau of Mines, RI8315," Dept. of Interior, 1978, pp. 1–15.
Flaschka et al., "Chelates in Anal. Chemistry," vol. 1, Marcel Dekku, Inc. N.Y., 1967, pp. 332–346.
Morrison et al., "Solvent Extraction in Anal. Chemistry," John Wiley & Sons, N.Y., 1957, pp. 21–30

*Primary Examiner*—Herbert T. Carter
*Attorney, Agent, or Firm*—Jerry F. Janssen

[57] ABSTRACT

A recyclable process for the recovery of tungsten from low level aqueous sources comprises adjustment of the pH of the source solution to a value below about pH 6, extraction of the tungsten values into an organic phase comprising a chelating agent, an organic transfer agent, and an inert organic solvent. Preferred chelating agents include vicinally disubstituted aromatic compounds in which the substituents are selected from amino, carboxyl, hydroxyl, and sulfhydryl.

17 Claims, 2 Drawing Figures

LIQUID-LIQUID EXTRACTION PROCESS FOR THE RECOVERY OF TUNGSTEN FROM LOW LEVEL SOURCES

CROSS-REFERENCE TO RELATED APPLICATIONS

This application is a continuation-in-part of copending application Ser. No. 059,803 filed July 23, 1979, now abandoned which, in turn, is a continuation-in-part of application Ser. No. 018,488 filed Mar. 8, 1979, now abandoned.

BACKGROUND OF THE INVENTION

This invention relates to the recovery of metals from low level aqueous sources by extraction. More particularly, it is concerned with a recyclable extration process for the recovery of tungsten from low level aqueous sources.

Tungsten is an important constituent of alloy-hardened metals and cutting tools, and is indispensable in the manufacture of electrical components such as heating elements and electric lamp filaments. The increasing scarcity and value of this vital metal require that efficient and economical means be found for the recovery of tungsten from sources which contain low levels of the metal.

Two important classes of low level sources of tungsten are naturally occurring alkaline brine solutions such as those of Searles Lake, Calif. and the effluents of hydrometallurgical plants which process tungsten-bearing ores. Searles Lake is estimated to contain approximately 170 million pounds of tungsten trioxide, but at brine concentrations of only 50–70 parts per million. Tungsten-bearing ore processing plant effluents likewise contain small but significant concentrations of tungsten, typically on the order of 50 parts per million.

A number of processes have been proposed for the recovery of tungsten from aqueous solutions, some based on the known tendency of tungsten to form complexes with a variety of chelating or complexing agents. Many of these processes are capable of efficient, often quantitative, recovery of tungsten in single-step extractions but are non-recyclable. Such processes have been applied to advantage in the analytical determination of tungsten or for small scale batch extractions of tungsten; however, single cycle extraction processes are not useful for the recovery of commercial quantities of tungsten from low level sources. The cost and waste disposal problems associated with the consumption of large amounts of reagent chemicals per pound of tungsten recovered prohibit the use of single cycle extraction processes for recovery of tungsten from such sources as Searles Lake brines.

The process in accordance with this invention provides a recyclable, efficient, and economical method for recovery of tungsten from low level aqueous sources such as natural alkaline tungsten-containing brines and hydrometallurgical plant waste streams.

SUMMARY OF THE INVENTION

A recyclable process for the recovery of tungsten from aqueous solution containing low levels of tungsten comprises a first step of adjusting the pH of the aqueous tungsten-containing solution to a value below about pH 6. The pH-adjusted aqueous solution is next contacted with an extractant organic phase comprising (1) a chelate compound comprising a vicinally disubstituted aromatic ring having substituents selected from the group consisting of amino, carboxyl, hydroxyl, and sulfhydryl, (2) a transfer agent, and (3) an inert organic solvent to extract tungsten from the aqueous solution into the organic phase. The tungsten-loaded organic phase is then separated from the tungsten-spent aqueous solution. The tungsten-loaded organic phase is next contacted with a basic aqueous stripping solution to transfer tungsten from the tungsten-loaded organic phase to the basic aqueous stripping solution. The tungsten-loaded basic stripping solution is then separated from the tungsten-spent organic phase and tungsten is isolated from the tungsten-loaded basic stripping solution. The tungsten-spent organic phase is next contacted with an aqueous regenerating solution to regenerate the extractant organic phase. The extractant organic phase is recycled by contacting with pH-adjusted aqueous tungsten-containing solution.

For a better understanding of the present invention, together with other and further objects, advantages and capabilities thereof, reference is made to the following disclosure and appended claims in connection with the above-described drawings.

DESCRIPTION OF THE PREFERRED EMBODIMENTS

According to the process of the present invention, tungsten is recovered from aqueous solutions by extraction in the form of a chelate complex into an inert organic solvent, followed by stripping of the tungsten from the organic system into an aqueous solution. The tungsten is then isolated from the aqueous stripping solution by conventional techniques. The organic system is regenerated and recycled. The recyclable process of this invention permits repeated use of the extractant organic phase and affords economic advantages over non-recyclable processes or tungsten extraction processes which employ consumable chemicals.

Figure 1:
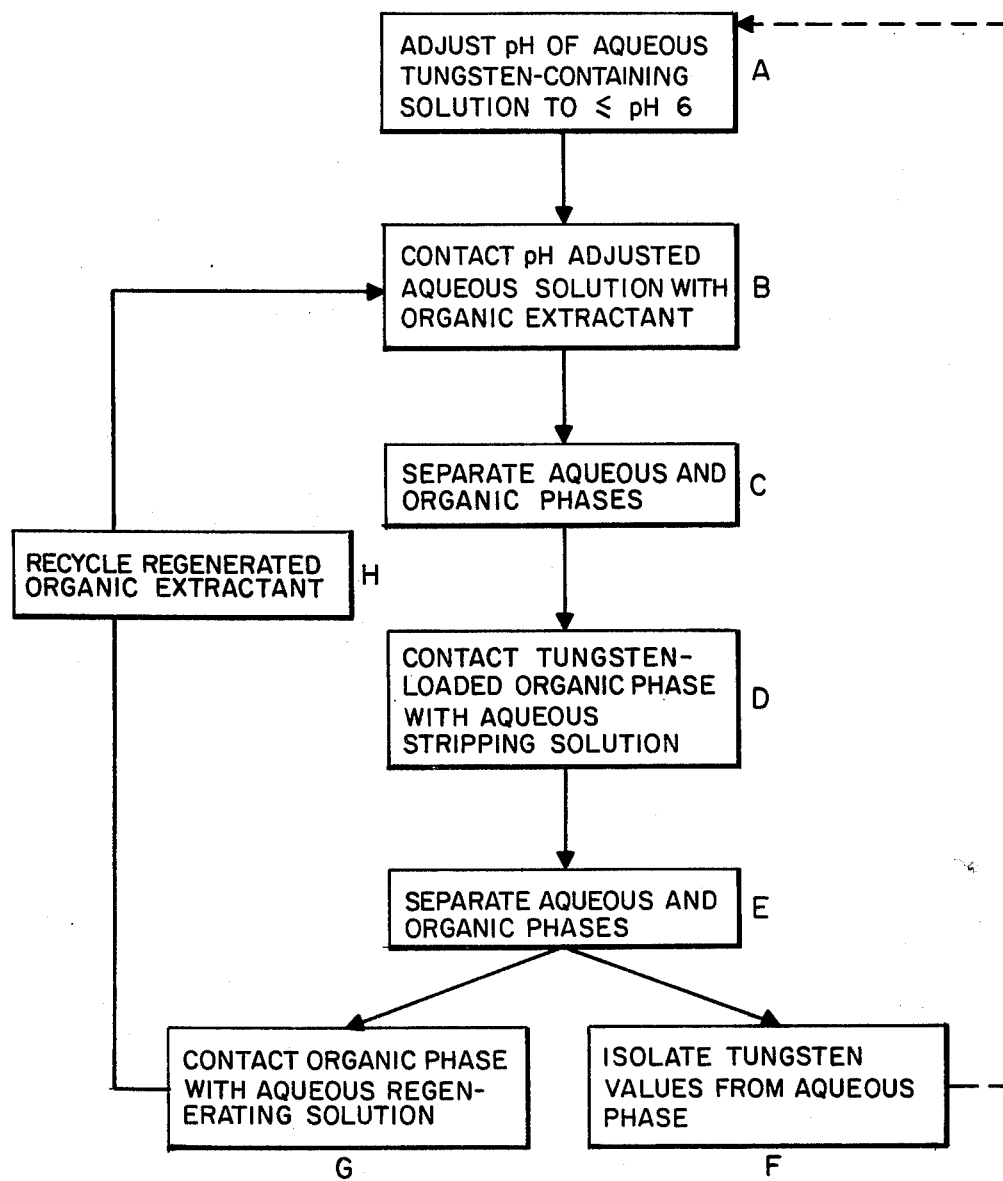
FIG. 1 is a schematic flow diagram for the process in accordance with the present invention.
Figure 2:
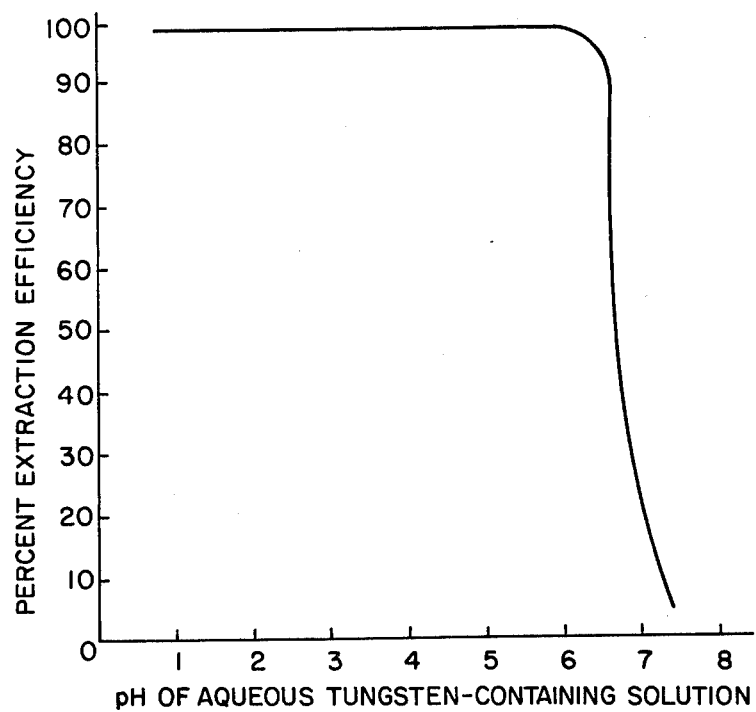
FIG. 2 is a graph illustrating efficiency of extraction of tungsten at various pH values.

The process of the present invention is presented schematically in FIG. 1 wherein there is shown at A the first step of adjustment of the pH of the aqueous tungsten containing solution to a value below about 6. The pH of naturally-occurring alkaline tungsten-containing brines may be as high as pH 9–10. The extraction of tungsten from such high pH sources using chelating agents with functional groups having labile hydrogens may permit effective recovery of tungsten in a single extraction, but the efficiency of tungsten extraction by such a method is non-recyclable and falls off rapidly with successive cycles. In accordance with the process of this invention, adjustments of the pH of the aqueous tungsten-containing source solution to a value below pH 6 permits the efficient recycling of the extractant efficiency in successive extraction cycles as illustrated in the examples given below. FIG. 2 illustrates the pronounced decrease in efficiency of tungsten extraction by the process of this invention when the pH of the tungsten source solution is above about pH 6.

The process is also effective for recovery of tungsten from brines from other sources such as process effluent or in-process streams at chemical plants treating raw brine for recovery of various salts. Such sources are typified by effluent from plants in which borax and soda ash are recovered from natural brines, such as Searles Lake brine, after first carbonating the brine, a process which does not remove tungsten. The carbonation in such a process reduces the brine alkalinity to a pH of about 7 to 8.5. Alkalinity of the naturally occurring brines may also be reduced by addition of an acid such as sulfuric or hydrochloric acid.

Referring again to FIG. 1, in the second step of the process of this invention shown at B, the pH-adjusted aqueous tungsten-containing solution is contacted with the organic extractant. The extractant organic phase comprises a chelating agent, a transfer agent, and an inert organic solvent. The chelating agent is an aromatic ring compound, vicinally disubstituted with substituents selected from amino, carboxyl, hydroxyl, and sulfhydryl. The two substituent groups may be alike or different. Chelating agents contemplated as falling within the scope of the invention are exemplified by, but are not limited to the following:

o-dihydroxybenzene
3,4-dihydroxytoluene
2,3-dihydroxynaphthalene
3,4-dihydroxy-1-nitrobenzene
1,2-dihydroxyanthraquinone
2,3-dihydroxybenzoic acid
3,4-dihydroxyphenyl acetic acid
4,5-dihydroxy-1,3-benzenedisulfonic acid disodium salt
o-diaminobenzene
3,4-diaminotoluene
o-aminophenol
3,4-dimercaptotoluene
o-hydroxybenzoic acid
o-aminobenzoic acid
o-mercaptobenzoic acid
3-hydroxypicolinic acid
1-hydroxy-2-naphthoic acid
2-amino-4-chlorobenzoic acid Tungsten forms a stable negatively-charged ion with these chelating agents in which the stoichiometry appears to be one tungsten atom for two molecules of chelating agent. While no particular theory of the structure of the complex ion is adhered to, it is thought that an octahedral complex forms about a central tungsten atom. The ease of formation and stability of the chelate ions is attributed to the formation of five- or six-membered ring structures involving tungsten and the oxygen-, sulfur-, or nitrogen-containing radicals of the chelating agents.

Quite stable chelate ions form when at least one of the substituent groups of the chelating agent is sulfhydryl. Preferred chelating agents for the process of this invention are sulfhydryl substituted carboxylic acids, particularly o-mercaptobenzoic acid.

A salt of a complex ion, soluble in organic solvents, forms between the negatively-charged tungsten chelate ion and the transfer agent which forms the second component of the organic extractant phase. Suitable transfer agents for the process of this invention include quaternary alkylammonium and quaternary alkylphosphonium salts of the general formulae $R_3(CH_3)N^+X^-$ or $R_3(CH_3)P^+X^-$ in which R represents a saturated, straight-chain $C_3$–$C_{10}$ hydrocarbon group and $X^-$ represents chloride or bromide. A preferred transfer agent is methyltricaprylylammonium chloride, available as "Aliquat 336" from General Mills, Chemical Division, 4620 West 77th Street, Minneapolis, MN 55435.

The function of the transfer agent is to form a neutral salt with the negatively charged tungsten chelate ion and facilitate the transfer of the complex into the hydrocarbon solvent which forms the third component of the extractant organic phase of the process in accordance with this invention.

Suitable solvents for the organic extractant phase for the process of this invention include hydrocarbons such as kerosene, toluene, the xylenes, or commercially available mixtures of branched or unbranched aliphatic or aromatic $>C_8$ hydrocarbon solvents such as SC-150 solvent. The solvent may additionally contain up to 20 volume percent of a long-chain aliphatic alcohol such as 2-octanol.

The volume ratio of aqueous source solution to organic extractant solution is suitably in the range of from 10-100. As shown by the Examples which follow, at these ratios of extractant solution to aqueous source solution, it is possible to achieve 85+% extraction of the tungsten values with a single cycle of the process with attendant ten- to one hundredfold increases in the concentration of tungsten values. Further concentration upgrading of the tungsten values occurs in the subsequent stripping step.

Referring again to FIG. 1, following extraction of the tungsten into the organic phase, in the next step of the process shown at C, the organic solution of tungsten complex is separated from the spent aqueous solution which latter solution may be alternatively discarded or recycled through the process.

In the next step of the process of this invention, shown at D, the organic solution of tungsten complex is contacted with an aqueous stripping solution which comprises a base such as sodium hydroxide, ammonium hydroxide, sodium carbonate or the like. This step brings about the transfer of tungsten values into the aqueous stripping solution with release of the organic chelating agent and transfer agent into the organic phase.

In those cases where an ortho-substituted carboxylic acid is employed as the chelating agent, it is a surprising and unexpected result that decomposition of the tungsten chelate complex by contacting the tungsten-loaded organic phase with an aqueous caustic stripping solution does not likewise extract the chelating agent into the aqueous phase. Although not holding to a particular theory, it is believed that the chelate compound remains in the organic phase in a deprotonated form, with the quaternary alkylammonium or alkylphosphonium transfer agent providing the counter ion. Thus, the chelating agent and transfer agent are not lost to the aqueous stripping solution, but remain in the organic phase which is recyclable following the step of regeneration. As shown by the Examples given below, the extractant organic phase which comprises the chelating agent, transfer agent, and organic solvent can be recycled repetitively with no appreciable diminution of the efficiency of tungsten extraction.

In the next step of the process of this invention, shown at E, the concentrated aqueous stripping solution containing the concentrated tungsten values is separated from the organic solution. At F, the aqueous solution of tungsten values, in the form of tungstate, is further processed by methods well known to the art to produce tungsten metal or tungsten compounds. Alternatively, the aqueous solution of tungsten values from this step may be recycled through the process for further concentration upgrading of the tungsten values.

The organic phase, containing a salt formed of the anionic form of the chelate compound and the cationic form of the transfer agent, is regenerated in the next step of the process shown at G. In this step the organic phase, separated in Step E, is contacted with an aqueous regenerating solution which contains both hydrogen ion and halide ion, preferably chloride ion. This step brings about regenerating the chelate compound and reconverting the transfer agent to the chloride form. As shown at H, the regenerated organic extractant phase is then recycled by contacting it with a fresh portion of pH-adjusted aqueous tungsten-containing solution.

To enable one skilled in the art to practice the present invention the following Examples are provided; these Examples are not to be construed as limiting the scope of the invention as herein described and claimed, but as merely illustrative thereof.

EXAMPLE I

A solution having the composition of Searles Lake brine was prepared by dissolving the appropriate salts in water as shown in Table I.

TABLE I

| CONSTITUENT | WEIGHT % |
| --- | --- |
| NaCl | 17.0 |
| $Na_2SO_4$ | 7.6 |
| KCl | 4.3 |
| $Na_2CO_3$ | 4.2 |
| $Na_2B_4O_7$ | 1.2 |
| $Na_2S$ | 0.2 |
| $Na_3PO_4$ | 0.07 |
| $Na_2WO_4 \cdot 2H_2O$ | 0.0088 |

The solution had a pH of 9.8 which was adjusted to pH 3.0 by addition of concentrated sulfuric acid. A 2.5 liter sample of this acidified aqueous source solution of tungsten values was shaken for one hour with 25 ml of organic solution of extractant which contained equimolar amounts of ortho-mercaptobenzoic acid and methyl tricaprylammonium chloride in a solvent comprising 90 volume % SC-150 solvent and 10 volume % 2-octanol. The orthomercaptobenzoic acid was present in an amount ten times the molar amount of tungsten to be extracted. Analysis of the two phases indicated that greater than 85% of the tungsten had been extracted into the organic phase.

EXAMPLE II

The steps of Example I were repeated, but employing an amount of ortho-mercaptobenzoic acid which was present in an amount fifteen times the molar amount of tungsten to be extracted. Analysis of the two phases after extraction indicated that greater than 95% of the tungsten had been extracted into the organic phase.

EXAMPLE III

The steps of Example I were repeated, but employing an organic solvent free of 2-octanol. Analysis of the two phases after extraction indicated that greater than 80% of the tungsten had been extracted into the organic phase.

Example IV illustrates the efficiency of the stripping of tungsten values from the organic solution of tungsten complex into the aqueous phase.

EXAMPLE IV

The steps of Example I were repeated to produce 25 ml of organic solution of tungsten complex. This solution was mechanically shaken with 12.5 ml of 3 M sodium hydroxide solution for thirty minutes. The two phases were separated and analyzed for tungsten content. The aqueous stripping solution of about 12 g/liter which represents a 200-fold upgrading of concentration in tungsten over the original source solution.

Example V illustrates the recyclability of the organic extractant solution of the process of this invention.

EXAMPLE V

The stripped extractant solution of Example IV was contacted with an additional 2.5 l acidified Searles Lake brine from Example I. The two solutions were mechanically shaken together for one hour after which the phases were separated and analyzed for tungsten content. It was found that greater than 80% of the tungsten had been extracted into the organic phase. This organic solution of tungsten complex was contacted with 12.5 ml of 3 M sodium hydroxide stripping solution and the phases separated. The aqueous stripping solution was found to contain 100% of the tungsten which was previously in the organic solution of complex. The organic solution of extractant was recycled five times with no apparent decrease in the efficiency of tungsten extraction.

Examples VI–XXII illustrate the use of various chelate compounds in the process according to the present invention.

EXAMPLES VI–XXII

In each of the following Examples, a 200 ml sample of the synthetic Searles Lake brine prepared according to Example I was extracted to recover the tungsten values. The brine sample was adjusted to pH 3.0 and then contacted for one hour with 20 ml of extractant solution. The extractant solution contained equimolar amounts of the chelating agent and Aliquat 336 dissolved in a solvent comprising 80 volume percent SC-150 and 20 volume percent 2-octanol. The amount of chelating agent was chosen to be ten times to molar amount of tungsten in the brine sample.

After the initial contacting step, the organic phase containing the tungsten complex and the spent aqueous brine solution were separated and each analyzed to determine the tungsten. The percent tungsten extracted into the organic extractant solution is shown in column 3 of Table 2.

The organic extractant solution containing the tungsten complex was then contacted for one hour with 3 M sodium hydroxide solution to strip the tungsten values. The tungsten, boron, and phosphorus contents of this aqueous stripping solution were analytically determined and the data appear in columns 4 and 5 of Table 2.

To demonstrate the recyclability of the regenerated organic extractant solution, the extractant solution from the above steps was contacted with an additional portion of fresh tungsten-containing brine solution with the brine to extractant solution volume ratio being 10:1. After one hour of contact time, the aqueous and organic phases were separated and the percent tungsten extracted into the organic phase analytically determined. The data appear in column 6 of Table 2.

TABLE 2

| EXAMPLE | TUNGSTEN CHELATING AGENT | FIRST PROCESS CYCLE TUNGSTEN EXTRACTED INTO | | | SECOND PROCESS CYCLE TUNGSTEN EXTRACTED INTO ORGANIC PHASE |
|---|---|---|---|---|---|
| | | ORGANIC PHASE % | AQUEOUS STRIPPING SOLUTION % | B:P:W RATIO | % |
| 1 | 2 | 3 | 4 | 5 | 6 |
| VI | o-dihydroxybenzene | 72 | 92 | 1.4:0.04:1 | 70 |
| VII | o-diaminobenzene | 79 | 71 | 4.7:0.006:1 | 77 |
| VIII | o-aminophenol | 67 | 81 | 4.7:0.002:1 | 75 |
| IX | o-aminothiophenol | 61 | 96 | 3.3:0.003:1 | 71 |
| X | 3,4-dihydroxytoluene | 76 | 99 | 2.2:0.13:1 | 89 |
| XI | 3,4-diaminotoluene | 89 | 90 | 2.8:0.10:1 | 95 |
| XII | 3,4-dimercaptotoluene | 94 | 88 | 2.8:0.11:1 | 83 |
| XIII | 1,2-dihydroxyanthraquinone | 65 | 95 | 3.2:0.04:1 | 64 |
| XIV | 3,4-dihydroxy-1-nitrobenzene | 89 | 99 | 1.4:0.09:1 | 90 |
| XV | o-hydroxybenzoic acid | 65 | 97 | — | 66 |
| XVI | 2,3-dihydroxybenzoic acid | 82 | 95 | 2.6:0.003:1 | 75 |
| XVII | 1-hydroxy-2-naphthoic acid | 85 | 90 | — | 93 |
| XVIII | 3,4-dihydroxyphenylacetic acid | 87 | 77 | 2.6:0.003:1 | 77 |
| XIX | o-aminobenzoic acid | 97 | 90 | — | 95 |
| XX | 3-hydroxypicolinic acid | 80 | 96 | — | 85 |
| XXI | 2-amino-4-chlorobenzoic acid | 90 | 78 | 1.6:0.097:1 | 96 |
| XXII | 4,5-dihydroxy-1,3-benzenedisulfonic acid disodium salt | 64 | 93 | 3.5:0.08:1 | 75 |

The data of Table 2 illustrate not only efficient extraction of tungsten values from low level aqueous sources by the process according to the present invention, but also the high specificity of the disclosed chelating agents for tungsten in the presence of large amounts of borate and phosphate. Searles Lake brine contains borate concentrations in approximately 600 molar excess of that of tungstate, and phosphate levels in elevenfold molar excess of tungstate. In order to utilize the unique chemical and metallurgical properties of tungsten it is necessary to minimize the levels of borate and phosphate contamination in the finished metal. Thus, the process of the present invention affords a useful method of isolating tungsten values from high borate-phosphate sources such as Searles Lake brine. The data of Table 2, for example, indicate an approximate hundred-fold decrease in borate to tungsten molar ratio after only one extraction cycle using an extractant containing a chelating agent in only ten-fold molar excess to the tungsten in the brine sample.

This is a surprising result in the light of the teachings of U.S. Pat. No. 3,826,808 which discloses that dihydroxyphenolic complexing agents react with boron and are to be used preferrably in amounts equal to the sum of the borate and tungstate to extract tungsten from borate-rich aqueous sources.

The process according to the present invention thus affords a method for inexpensively and efficiently extracting tungsten from low level aqueous sources rich in phosphate and borate, employing minimal volumes of a recyclable extractant.

EXAMPLES XXIII–XXVII

These examples illustrate the effect of pH upon the efficiency of extraction of tungsten from aqueous solutions by the process in accordance with this invention. Samples of simulated Searles Lake brine prepared in accordance with Example I were treated at various pH values with an organic extractant solution including ortho-mercaptobenzoic acid (OMBA). The extractant solution was equimolar in OMBA and methyl tricaprylylammonium chloride, dissolved in SC-150 solvent. The molar ratio of OMBA to tungsten was held constant at 10:1 in the case of each extraction.

In each example, fifteen volumes of pH adjusted tungsten containing brine were contacted with one volume of organic extractant solution for one hour after which time the organic and aqueous phases were separated and analyzed for tungsten content. The efficiency of each extraction, expressed at percent tungsten extracted into the organic phase, is given in Table 3. The date of Table 2 have been plotted in FIG. 2 which shows dramatically the decrease in extraction efficiency at pH values above about pH 6.

TABLE 3

| EXAMPLE | pH | PERCENT TUNGSTEN EXTRACTED INTO ORGANIC PHASE |
|---|---|---|
| XXIII | 2.5 | ~100 |
| XXIV | 3.0 | ~100 |
| XXV | 4.0 | ~100 |
| XXVI | 5.0 | ~100 |
| XXVII | 6.0 | ~100 |
| XXVIII | 7.0 | ~20 |

While there has been shown and described what are at present believed to be preferred embodiments of the invention, it will be obvious to those skilled in the art that various changes and modifications may be made therein without departing from the scope of the invention as defined by the appended claims.

What is claimed is:

1. A recyclable process for recovering tungsten from aqueous solutions containing low levels of tungsten comprises the steps of:
   (a) Adjusting the pH of the aqueous tungsten-containing solution to a value below about pH 6;
   (b) Contacting the pH-adjusted aqueous tungsten-containing solution with an extractant organic phase comprising:
      (1) A chelate compound comprising a vicinally disubstituted aromatic ring having substituents selected from the group consisting of amino, carboxyl, hydroxyl, and sulfhydryl,
      (2) A transfer agent, and
      (3) An inert organic solvent, to extract tungsten from said pH-adjusted aqueous solution into said organic phase;

(c) Separating the tungsten-loaded organic phase from the tungsten-spent aqueous solution;

(d) Contacting said tungsten-loaded organic phase with a basic aqueous stripping solution to transfer tungsten from said tungsten-loaded organic phase to said aqueous stripping solution;

(e) Separating the tungsten-loaded aqueous stripping solution from the tungsten-spent organic phase and thereafter isolating the tungsten values from said tungsten-loaded aqueous stripping solution;

(f) Contacting the tungsten-spent organic phase with an aqueous regenerating solution to regenerate said extractant organic phase; and (g) Recycling the regenerated extractant organic phase in step (b).

2. The process in accordance with claim 1 wherein said chelate compound is selected from the group consisting of:
o-dihydroxybenzene
3,4-dihydroxytoluene
2,3-dihydroxynaphthalene
3,4-dihydroxy-1-nitrobenzene
1,2-dihydroxyanthraquinone
2,3-dihydroxybenzoic acid
3,4-dihydroxyphenyl acetic acid
4,5-dihydroxy-1,3-benzenedisulfonic acid disodium salt
o-diaminobenzene
3,4-diaminotoluene
o-aminophenol
3,4-dimercaptotoluene
o-hydroxybenzoic acid
o-aminobenzoic acid
o-mercaptobenzoic acid
3-hydroxypicolinic acid
1-hydroxy-2-naphthoic acid
2-amino-4-chlorobenzoic acid.

3. The process in accordance with claim 1 wherein said transfer agent comprises a quaternary alkylammonium or quaternary alkylphosphonium salt.

4. The process in accordance with claim 2 wherein said transfer agent consists essentially of methyl tricaprylylammonium chloride.

5. The process in accordance with claim 1 wherein said aqueous regenerating solution includes hydrogen ion and chloride ion.

6. The process in accordance with claim 4 wherein said inert organic solvent is selected from the group consisting of kerosene, toluene, xylenes, $>C_8$ aliphatic hydrocarbons, $>C_8$ aromatic hydrocarbons, and mixtures thereof.

7. The process in accordance with claim 6 wherein said inert organic solvent further contains up to 20 volume percent of a $\leq C_{10}$ aliphatic alcohol.

8. The process in accordance with claim 1 wherein the volume ratio of said pH-adjusted aqueous tungsten-containing solution to said extractant organic phase is from about 10 to about 100.

9. The process in accordance with claim 1 wherein said chelate compound comprises a vicinally disubstituted aromatic ring wherein at least one substituent is sulfhydryl.

10. The process in accordance with claim 9 wherein said chelate compound consists of o-mercaptobenzoic acid.

11. The process in accordance with claim 1 wherein said stripping solution includes sodium hydroxide.

12. A recyclable process for recovering tungsten from aqueous solutions containing low levels of tungsten comprising the steps of:

(a) adjusting the pH of the aqueous tungsten-containing solution to a value below about pH 6;

(b) contacting the pH-adjusted aqueous tungsten-containing solution with an extractant organic phase comprising:
  (1) o-mercaptobenzoic acid,
  (2) a quaternary alkylammonium salt transfer agent, and
  (3) an inert organic solvent, to extract tungsten from said pH-adjusted aqueous solution into said organic phase;

(c) separating the tungsten-loaded organic phase from the tungsten-spent aqueous solution;

(d) contacting said tungsten-loaded organic phase with a basic aqueous stripping solution to transfer tungsten from said tungsten-loaded organic phase to said aqueous stripping solution;

(e) separating the tungsten-loaded aqueous stripping solution from the tungsten-spent organic phase and thereafter isolating the tungsten values from said tungsten-loaded aqueous stripping solution;

(f) contacting the tungsten-spent organic phase with an aqueous regenerating solution including hydrogen ion and chloride ion to regenerate said extractant organic phase; and (g) recycling the regenerated extractant organic phase to step (b).

13. The process in accordance with claim 12 wherein said quaternary alkylammonium salt transfer agent consists of methyltricaprylylammonium chloride.

14. The process in accordance with claim 13 wherein said inert organic solvent is selected from the group consisting of kerosene, toluene, xylenes, $C_7$–$C_{10}$ aromatic hydrocarbons, and mixtures thereof.

15. The process in accordance with claim 14 wherein said inert organic solvent further contains up to 20 volume percent of a $\leq C_{10}$ aliphatic alcohol.

16. The process in accordance with claim 12 wherein said stripping solution includes sodium hydroxide.

17. The process in accordance with claim 1 or claim 12 wherein said aqueous solution containing low levels of tungsten comprises Searles Lake brine.

* * * * *